Dec. 6, 1960     M. MITROVICH     2,963,246
RETRACTABLE LANDING GEAR FOR AIRCRAFT

Filed May 21, 1956     3 Sheets-Sheet 1

INVENTOR.
Milenko Mitrovich
BY
W. R. Robertson
AGENT

Dec. 6, 1960   M. MITROVICH   2,963,246
RETRACTABLE LANDING GEAR FOR AIRCRAFT
Filed May 21, 1956   3 Sheets-Sheet 2

INVENTOR.
Milenko Mitrovich
BY
W. R. Robertson
AGENT

Dec. 6, 1960  M. MITROVICH  2,963,246
RETRACTABLE LANDING GEAR FOR AIRCRAFT
Filed May 21, 1956  3 Sheets-Sheet 3

INVENTOR.
Milenko Mitrovich
BY
W. R. Robertson
AGENT

United States Patent Office 2,963,246
Patented Dec. 6, 1960

2,963,246

RETRACTABLE LANDING GEAR FOR AIRCRAFT

Milenko Mitrovich, Chestnut Hill, Mass., assignor to Chance Vought Aircraft, Incorporated, Dallas, Tex., a corporation of Delaware Filed May 21, 1956, Ser. No. 586,210

16 Claims. (Cl. 244—102)

The present invention relates to retractable landing gear for aircraft and more particularly to an improved construction and arrangement for a landing gear unit mounted on and substantially wholly retractable into a restricted space within an aircraft fuselage.

The present invention is directed to an improved main landing gear unit which is fuselage-mounted and which, by virtue of its construction, fits readily when retracted into a fuselage space allotted thereto without waste of space and without interference with neighboring items whose locations may be critical and which therefore cannot conveniently or advisedly be moved to provide room for the landing gear unit.

It is, accordingly, a major object of this invention to provide an aircraft landing gear unit characterized, in retraction, by a self-accomplished repositioning of its parts relative to each other as well as to the aircraft for readily and easily fitting those parts into the bounds of a fuselage recess provided therefor.

Another object is to provide a landing gear unit whose component parts experience, during extension, a positional change relative to each other and to the aircraft to establish a configuration well suited for supporting the aircraft on the ground.

A further object is to provide a unit landing gear which is well adapted for receiving and withstanding the shocks of landing impact and runway irregularities while transmitting a minimum of such shocks to the aircraft.

Yet another object is to provide a landing gear unit having components pivotable on the aircraft on a common axis for extension and retraction, and on different axes for shock absorption.

A still further object of the invention is to provide a landing gear unit, of the sort thus far stated, a component of which moves along its own axis during extension and retraction of the unit for effecting a shift in spatial relationship between parts of the unit.

An additional object is to provide a landing gear unit which is rugged and strong in construction, simple and dependable in operation, and of compact configuration.

Other objects and advantages will be apparent from the specification and claims and from the accompanying drawings which illustrate an embodiment of the invention.

In the accompanying drawings,

Figure 3 is a view, taken along line III—III of Figure 1 and looking inboard and down, of the eccentric body;

Figure 1:
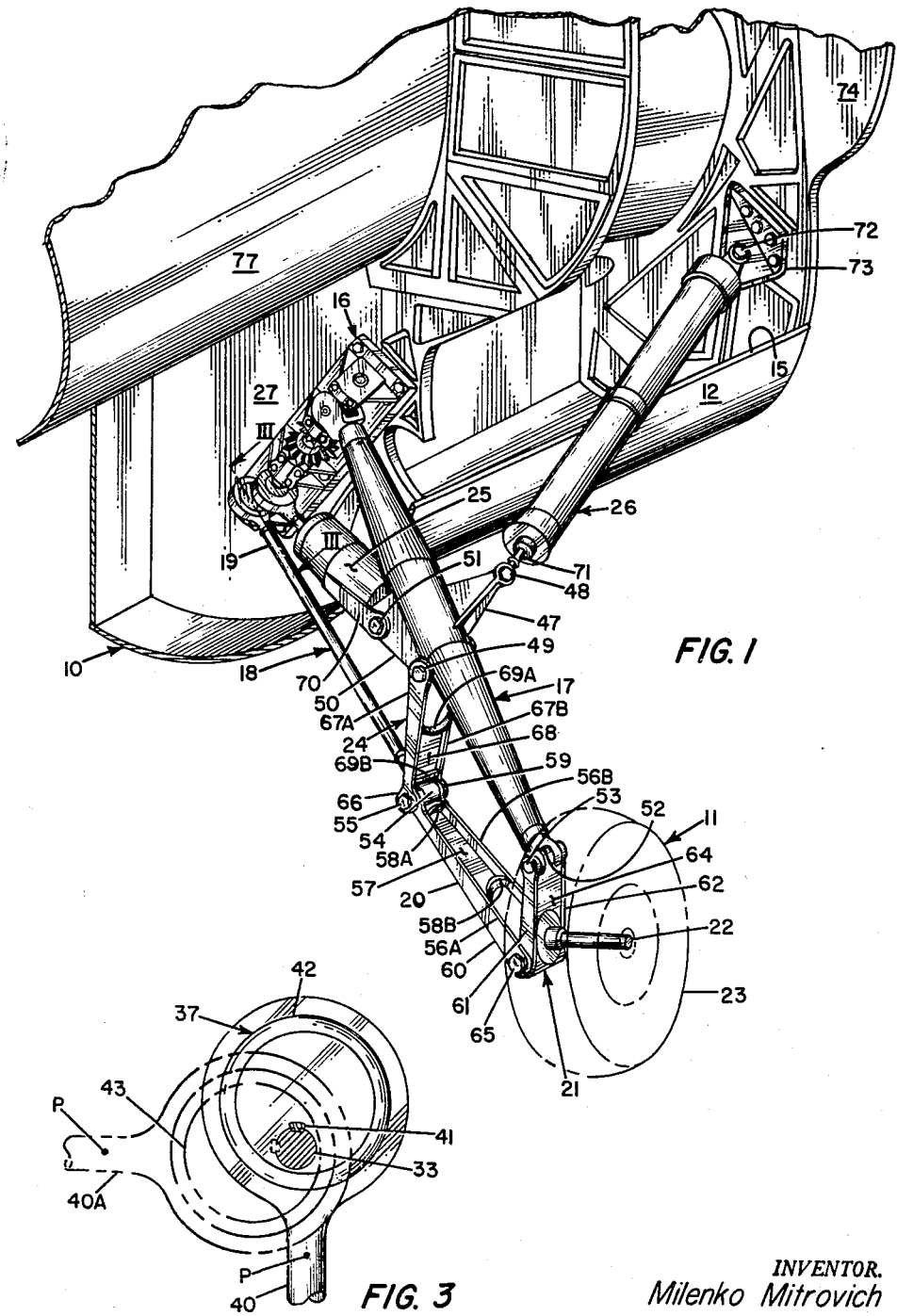
Figure 1 is a perspective view of part of the left-hand side of a fuselage of an aircraft to which one form of the present invention has been applied, most of the fuselage skin being shown as cut away to reveal components of the invention, the landing gear unit being extended.

Referring now to Figure 1 of the drawings, an aircraft fuselage 10 is provided with left- and right-hand main landing gear units symmetrically located on opposite sides of the fuselage and, their opposite-handedness excepted, substantially identical to each other in construction and operation. Because of the high similarity between the two units, the left-hand unit 11 may be understood to be typical of both; accordingly, only the left-hand unit is shown and described herein. An opening, of course, must be provided in the skin 12 to allow entry of the landing gear unit 11 and an actuator 26 therefor into the fuselage. The skin edge bounding the lower side of such an opening is shown at 15, the skin above the opening not being shown. Because not forming an essential part of the present invention, no showing is made of the door (or doors) provided for closing this opening.

The unit 11 comprises a four-bar linkage or supporting structure which includes a fixed member 16, an upper, first movable member 17, a lower, second movable member 18 with upper and lower segments 19, 20, and an outer end member 21. An axle 22 bearing a wheel 23 is rigidly mounted on the end member 21, the upper and lower members 17, 18 are medially connected by a connecting member 24, and a resilient member such as a shock absorber 25 extends obliquely between the upper movable member 17 and the fuselage 10. An actuator 26 extends in a generally fore-and-aft direction between the upper member 17 and the fuselage 10.

The fixed member 16 serves as an inner end member of the four-bar linkage and may be a fitting which is rigidly mounted on fuselage fixed structure, such as a bulkhead 27, which is strong enough to withstand loads imposed upon it by the landing gear unit 11. Where the bulkhead 27 or the like fixed structure is strong enough and provides the required mounting points or locations, the upper and lower members 17, 18 and shock absorber 25 may be pivotally mounted directly thereon, and the fixed member 16, then comprised by the fixed structure itself, need not be made as a separate entity. In any event, there must be provided on the fixed member 16 in the one case, or directly on the fixed structure 27 in the other, aligned mounting means, such as will be described, for the upper and lower members 17, 18 and shock absorber 25 and for a connecting means (to be described).

Figure 2:
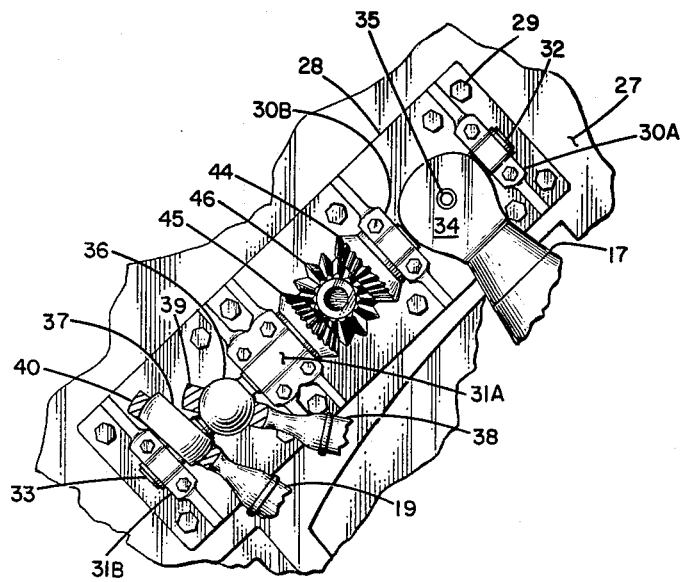
Figure 2 is a view, looking aft, of the fixed member and the connecting and mounting means provided thereon.

Refer to Figures 1 and 2. Although it may vary in shape to render it most efficient for use with a particular structure on which it is rigidly attached, the fixed member 16 of the example, shown in greater detail in Figure 2, includes a generally rectangular reinforced plate 28 strongly constructed, positioned to slant upwardly and outwardly relative to the fuselage, and rigidly attached by suitable means such as bolts 29 to the forward face of the bulkhead 27.

Four parallel, aligned, spaced apart flange- or bracket-like mounting members or bearings 30A, 30B, 31A, 31B, rigidly attached to or integral with the plate 28, extend forwardly from the latter. The upper pair 30A, 30B of these bearings is adapted to journal the upper and lower ends of an upper shaft 32, and a lower shaft 33 is similarly rotatably mounted by the lower pair 31A, 31B. The shafts 32, 33 lie in spaced, end-to-end, coaxial relationship, and are freely rotatable in their respective bearings about their common axis, which, relative to the aircraft, extends upwardly and outwardly in a plane preferably normal to the centerline of the aircraft.

The upper end of the upper movable member 17 is provided with a U-shaped, bifurcate fitting 34 whose legs extend astraddle the upper shaft 32 between the upper pair of bearings 30A, 30B, the closed side of the U being rigidly attached to or integral with the upper member 17. A pivot pin 35 extends through the fitting 34 and shaft 32 in a direction normal to the latter and permits pivoting of the fitting in a plane extending axially of the shaft, and the fitting 34 is additionally rotatable with the upper shaft 32 about the axis of the latter.

Two partially spherical bodies 36, 37 concerned respectively with the mounting of the upper ends of the shock absorber 25 and lower member upper segment 19 on the lower shaft 33 are located on the latter between the lower pair of bearings. These bodies 36, 37 may be integral with the shaft 33 or may be pierced thereby; the lowermost body 37, which mounts the lower member, is eccentrically mounted on the shaft 33 and must be constrained to turn therewith, while both must be immobile axially of the shaft 33.

The upper partially spherical body 36 is spherical about a center lying on the centerline of the shaft 33. The shock absorber 25 has a piston rod 38 provided at its upper end with an annular fitting 39 whose inner surface complements and encircles the upper body 36, thus mounting the shock absorber on the shaft 33 and rendering it pivotable thereon in vertical as well as fore-and-aft directions.

The eccentric body or element 37 is spherical about a center which is displaced from the centerline of the shaft 33 by an interval equal to at least half the desired change in effective length of the lower member 18 during extension and retraction of the landing gear unit 11 for effecting, as will be explained, a repositioning of the wheel 23 relative to the upper member 17. The lower member's upper segment 19 is provided with an annular fitting 40 complementary to and encircling the eccentric body 37 for pivotally mounting the upper segment 19 on the shaft 33, and, within appropriate limits, the upper segment 19 is pivotable in any direction about the eccentric body 37. The spherically formed surface of the eccentric body 37 should be wide enough to afford ample bearing surface for the upper segment end fitting 40 throughout the range of pivotal motion of the latter about an axis normal to the lower shaft 33 when, as shown in Figures 1 and 2, the landing gear unit 11 is in its extended position, this pivotal motion occurring when runway pressure against the wheel forces the wheel 23 upward from its airborne, fully extending position.

Referring to Figures 2 and 3, the eccentric body or element 37 is eccentrically mounted on the shaft 33, and its necessary constrainment to rotate with the latter may be effected by an arrangement such as splines or a shaft key 41. When the landing gear unit is extended, the eccentric body 37 occupies, for example, the position shown in solid lines at 42; when the unit is retracted, the eccentric body 37 rotates with the shaft 33 and its center moves forwardly until the eccentric body occupies, for example, the position shown in dotted lines at 43. The fitting 40 encircles and is concentric with the eccentric body 37 and, when the landing gear is retracted, is rotated, by means to be described, forwardly and counterclockwise about the shaft 33 through, for example, 90 degrees. At the same time, the eccentric body 37 undergoes clockwise rotation with the shaft 33 through, for example, 90 degrees. As a result of these two rotations, where they are of the extents given by way of example, the fitting 40 undergoes a positional change of 180 degrees, and a given point P on the centerline of the upper segment 19 is moved away from the centerline of the shaft 33 by a distance equal to twice the eccentricity of the eccentric body 37. Where the total rotary change is smaller than 180 degrees, the linear distance through which the point P is moved is accordingly less. Transmitted to the upper and lower segments 19, 20 (Figure 1) of the lower member 18, this axial motion of the lower member 18 effects the equivalent of a lengthening or extension of the lower member 18 during retraction of the unit 11, the entire process being reversed during extension. Though more particularly described below, it will be mentioned at this point that the members 17, 18 are pivotally connected at their outer ends to the ends of (and thus are connected by) the outer end member 21, which latter member mounts, through the axle 22, the wheel 11. As a consequence, the effective change in length of the lower member 18 effects a pivoting of the end member 21 on the upper member 17 which in turn results in a repositioning of the wheel 23 relative to the upper member 17. If a particular application requires that the wheel 23 be repositioned relative to the upper member 17, when retracted, in a direction requiring shortening (rather than lengthening) of the lower member 18 during the retraction process, such shortening may readily be effected by repositioning the eccentric 37 through 180 degrees on the shaft 33.

Referring again to Figure 2, the connecting means, for transmitting rotary motion of the upper member 17 about the axis of the upper shaft 32 to the eccentric body 37, connects the upper member end fitting 34 through the eccentric body 37 to the lower member 18 and includes the upper shaft 32, a first bevel gear 44 rigidly mounted coaxially with the upper shaft 32 on the inboard end thereof, the lower shaft 33, a second bevel gear 45 similarly mounted on the outboard end of the lower shaft 33, a third bevel gear 46 meshed with the first and second gears and pivotally mounted on the fixed member plate 28 with its axis normal to the axis of the other two gears, and the eccentric body 37 rigidly mounted on the inboard end of the lower shaft 33. Rotary motion imparted to the upper shaft 32 by the upper fitting 34 turns the upper shaft gear 44, which drives the middle gear 46, the latter in turn driving the lower shaft gear 45 and consequently effecting rotation of the lower shaft 33 and the eccentric element 37 mounted thereon. With the middle bevel gear 46 interposed as described between them, the coaxial upper shaft and lower shaft bevel gears 44, 45, and hence the upper member upper fitting 34 and eccentric body 37, rotate in opposite directions when the landing gear is extended and retracted.

Refer to Figure 1. The first or upper movable member 17, pivotally mounted as described by the upper shaft 32 on the fixed member 16, functions as a supporting member and accordingly is of relatively heavy, rigid, spindle-shaped construction in order that it may efficiently transmit the majority of the fore-and-aft, torque, and vertical loads imposed, through the wheel 23 and axle 22, on the four-bar linkage into the upper shaft 32 and thence, through the shaft bearings 30A, 30B and the fixed member 16, into the fuselage bulkhead 27. Near its middle, the upper member 17 has a rigid aft-side fitting or arm 47 which is connected to the lower end of the actuator 26 by a pivot pin or bolt 48 which is generally parallel to the upper and lower shafts 32, 33. Near the arm 47, the upper member 17 is pierced in a fore-and-aft direction normal to the upper member 17, by a pin or bolt 49 by means of which the upper end of the connecting member 24 is pivotally mounted on the upper member 17. Above the connecting member bolt 49, a rigid arm or fitting 50 extends inboard from the lower side of the upper member 17, and this arm 50 articulates with the lower end of the shock absorber 25 and is pivotally attached thereto by a bolt 51 lying parallel to the connecting member bolt 49. At its lower end, the upper member 17 has a bifurcation 52 which interdigitates (that is, interlocks as a finger or fingers of one hand interlying two or more fingers of another) with the upper end of the end member 21 and is pivotally attached thereto by a pivot pin or bolt 53 lying substantially parallel to the connecting member bolt 49.

Comprising an upper segment 19 and a lower segment 20, the entire lower member 18 operates as a motion-transmitting member and participates in positioning the wheel 23 relative to the upper member 17. In addition, the member 18 bears in tension the ground loads tending to tilt the top of the wheel toward the upper member and its lower segment 20 acts as one member of a torque linkage (to be described). The upper segment 19 is mounted, as previously explained, by the eccentric body 37, shaft 33, and bearings 31A, 31B on the fixed member 16. Required to take only tension loads, the upper segment 19 may be of comparatively light construction, and has at its lower end a fitting 54 which preferably should be axially adjustable to permit variation in the fixed length of the upper segment 19 as required for adjustment of the four-bar linkage during installation and maintenance procedures and which is adapted for receiving a pivot pin or bolt 55. Any convenient means may be employed in making the end fitting 54 adjustable axially of the upper segment 19; for example, according to a well-known construction that need not be illustrated or further described, the lower end of the upper segment 19 may be provided with an axial, threaded, end passage and the end fitting 54 may be provided with a rod-like, threaded end portion rotatingly insertable into the upper segment until the segment 19, with the end fitting 54, is of a desired over-all fixed length.

The lower segment 20 bears not only tension loads, but torque and bending loads as well, and should be constructed to bear such loads efficiently. For this reason, the lower segment 20 of the example is generally of I-beam construction with front and rear lengthwise flanges 56A, 56B connected by a web 57 strengthened at its upper and lower edges by reinforcing flanges 58A, 58B. To facilitate the attachment of connecting parts and to provide necessary operating clearances, the lengthwise flanges 56A, 56B project beyond the web 57 at each end of the lower segment and thus provide upper- and lower-end bifurcations 59, 60 respectively interdigitated with adjoining ends of the upper segment 19 and end member 21, the upper and lower segments 19, 20 being pivotally connected by a pivot pin or bolt 55 lying parallel with the connecting member upper pivot bolt 49.

From the above, it will be seen that the first and second of the three movable components of the four-bar linkage are the above-described supporting member 17 and motion-transmitting member 18. The other member is the end member 21, which must be strongly made in order that it may receive and directly or eventually transmit into the first and second members 17, 18 all the forces imposed on the unit by the wheel 23 through the axle 22, it preferably comprises forward and aft lengthwise flanges 61, 62 lying normal to and connected by a web 64 which faces the wheel 23. The web 64 is omitted as required for clearance at the upper end of the end member 21 in order that the lower segment flanges 56A, 56B may be snugly interdigitated with the lower-end bifurcation 52 of the upper movable member 17 and pivotally connected thereto by the bolt 53 which is generally parallel to the connecting member upper pivot bolt 49. The end member flanges 61, 62 similarly interdigitate at their lower ends with the lower segment flanges 56A, 56B and are attached thereto by a pivot pin 65 also parallel to the connecting member pivot pin 49. The axle 22 is strongly and rigidly attached in generally right-angular, outwardly extending relation to the end member 21 near the lower end thereof. The wheel 23, of course, is rotatably mounted on the axle 22. As the upper and lower members 17, 18 extend laterally outwardly as well as downwardly from the fuselage 10, the end member 21 holds the wheel 23 far enough removed laterally from the lengthwise centerline of the aircraft to ensure good lateral stability of the aircraft on the ground.

The functions of the connecting member 24 include self-alignment of the two parts 19, 20 of the lower member 18 through control of the spacing between the upper member 17 and the interconnected ends of the lower member upper and lower segments 19, 20; in addition, the connecting member receives torque and bending loads and serves in cooperation with the lower segment 20 as a flexible torque linkage. Some of the ground-imposed forces which tend to rotate the end member 21 around its snug articulation with the upper member 17 are, of course, received by the upper member 17 at its lower end; a large percentage of these forces, however, are received by the lower segment 20 from the lower end of the end member 21 through its connection thereto by the pivot pin 65. To receive these loads and to transmit them into the strong mid-portion of the upper member 17, a bifurcation 66 is provided on the lower end of the connecting member 24 which snugly interdigitates with the upper-end bifurcation 59 of the lower segment 20 and is attached thereto by the bolt 55 which also connects the adjoining ends of the upper and lower segments 19, 20. To enable it to take the required loadings, the connecting member 24 is preferably made with forward and aft flanges 67A, 67B which receive the upper and lower pivot bolts 49, 55, the flanges being connected by a web 68 and by reinforcing flanges 69A, 69B.

The shock absorber 25 has a body; an upper end fitting 39 previously described and pivotally mounted, by means of the associated partially spherical body 36, lower shaft 33, lower pair of bearings 31A, 31B, and fixed member 16, on fixed structure of the aircraft, namely on the bulkhead 27; and a bifurcate lower-end fitting 70 which interdigitates with and is pivotally attached to the rigid inboard arm 50 of the upper member 17 by the bolt 51. The shock absorber 25 serves as a diagonal brace between the upper member 17 and fixed member 16, is internally loaded to urge the upper member toward the downward end of its extended-position range of pivotal motion on the pin 35, and when more than normal static upward loads are imposed on the wheel 23 yields to allow controlled collapsing of the four-bar linkage of the landing gear unit 11 in order that upward motion of the wheel 23, relative to the fuselage 10, may occur and that the shock of landing impact, bumps, etc. may be cushioned and damped. The shock absorber 25 need not be attached to the upper member 17 and fuselage 10 in the precise places shown and described; any attachment points are obviously satisfactory which enable it to serve efficiently the functions specified above. For the sake of compactness of the landing gear unit 11, however, it is preferable that the shock absorber 25 lie between the upper and lower members 17, 18. The shock absorber 25 may be of any desired type; in the specific embodiment of the invention herein described, a liquid-spring type shock absorber has been found desirable because of its relatively light weight and because the relatively small size of such a unit readily permits its installation between the upper and lower members 17, 18 as described. Liquid spring shock absorbers have become well known in the art; published descriptive information relative thereto includes the illustrated article "Liquid Spring Offers Strut Gains" appearing in the March 23, 1953, issue of the periodical Aviation Week.

The linear actuator may be a hydraulically operated jack 26 of any conventional structure wherein a piston is operated to and fro in the jack through energization by a suitable fluid system. The fluid system is connected to opposite ends of the jack 26 through suitable valves for directing flow of fluid to the jack at opposite ends thereof to cause reciprocation of a piston within the body of the jack, thereby causing reciprocation of a piston rod 71. Such hydraulic systems are well known in the art, and further description thereof is accordingly unnecessary. The actuator 26 serves as a source of energy which moves the landing gear unit 11 between its extended and retracted positions, and in the extended position of the unit serves also as a drag strut which receives and bears loads tending to move the wheel 23 forwardly or rearwardly, loads in the latter direction generally being the greater.

In order that it may perform these functions, the actuator 26 should be of adequately heavy construction, should preferably be pivotally attached to a component of the landing gear unit 11, for example as at 48 to the upper member 17, and must extend in a generally fore-and-aft direction to an item of fixed fuselage structure, to which it should preferably be pivotally attached. In the example, the actuator 26 is pivotally attached at the external end of its piston rod 71 to the rearwardly extending arm 47 of the upper member 17 by the bolt 48, extends rearwardly and upwardly into the fuselage 10, and is attached by a pivot bolt 72 to a fitting 73 rigidly mounted on a fuselage bulkhead 74, both bolts 48, 72 lying generally parallel to the shafts 32, 33.

When the actuator piston rod 71 is in its fully retracted position, the landing gear unit 11 is in its fully extended position wherein the upper and lower members 17, 18 extend downwardly and outwardly from the fuselage 10 and the outer end member 21 and wheel 23 is positioned generally vertically and in proper alignment for rolling of the wheel during forward motion of the aircraft on the runway. Fed into the end member 21 from the wheel 23 through the axle 22, runway-imposed forces tending to move the wheel 23 in a fore-and-aft direction relative to the fuselage 10 urge the end member 21 to move rearwardly and also tend to rotate it about its articulation with the upper member 17. Rearward forces from the end member 21 are received by the lower end of the upper member 17 and transmitted through the upper member into the actuator 26 and thence into the actuator bulkhead 74. The majority of the forces tending to rotate the end member 21 about the upper member 17 are received by the lower member lower segment 20, transmitted to the connecting member 24, and imparted by the latter into the midsection of the upper member 17, whence they are transmitted through the upper member and its mounting means into the fixed member 16 and fuselage bulkhead 27.

Figure 6:
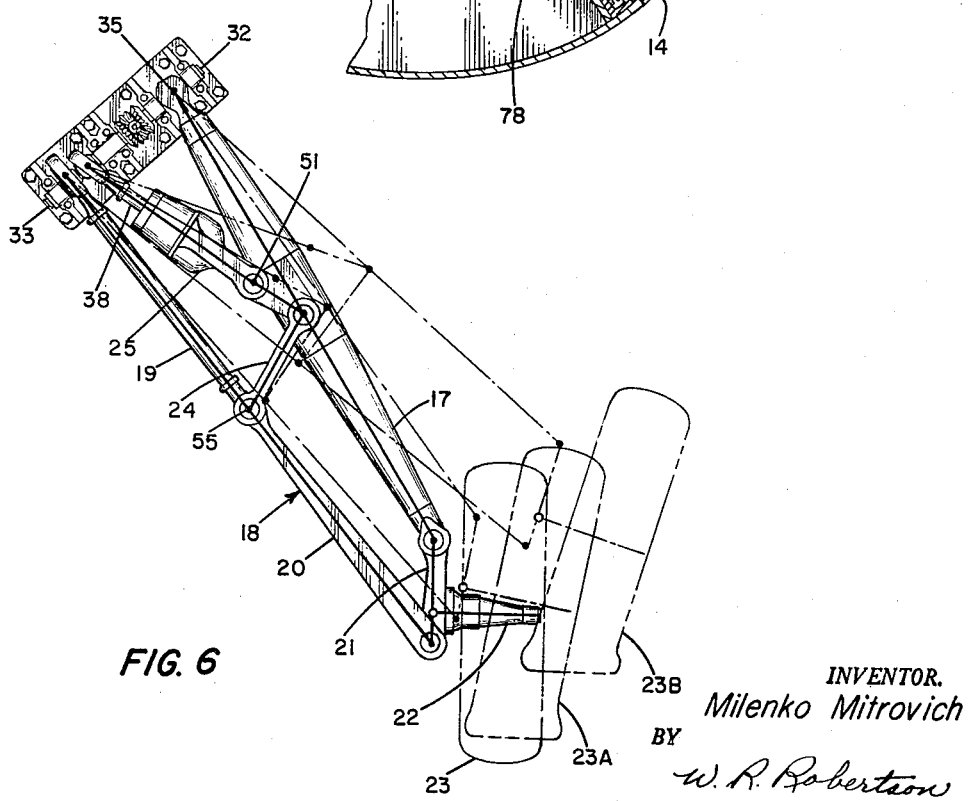
Figure 6 is a partially diagrammatic view, looking aft, of the landing gear unit showing the relative disposition of parts thereof in three extended positions of the wheel.

Referring now to Figure 6, and assuming the aircraft to be airborne, the internally loaded shock absorber 25 exerts a pulling force on the upper member 17 which holds the upper member at the lower end of its extended-position range of pivotal travel about the pin 35 piercing the upper shaft 32. The fully retracted piston rod 38 of the shock absorber 25 cannot be moved further into the shock absorber; hence, the shock absorber prevents any further downward pivoting of the upper member 17 which might be urged by gravitational or other forces. The weight of the wheel 23 on the axle 22 tends to rotate the end member 21 in an inward direction on the upper member 17, but this is prevented by the lower member 18, which holds the lower end of the end member 21 rigidly in place relative to the upper member 17. Buckling of the lower member 18 at the bolt 55 joining its upper and lower segments 19, 20 is prevented by the connecting member 24, which holds the bolt 55 immobile relative to the upper member.

When the weight of the aircraft is placed on its landing gear, the runway imposes an upward force on the wheel 23 which, transmitted through the axle 22 into the end member 21, tends to move the latter upward, thus pivoting the upper and lower members 17, 18 and the shock absorber 25 respectively upward about the pivot pin 35 and the partially spherical mounting bodies 36, 37 (Figure 2). With continued reference to Figure 6, this pivotal motion increases the interval between the lower shaft 33 and lower-end mounting pin 51 of the shock absorber 25, and tends to pull the piston rod 38 outwardly from the shock absorber. The shock absorber 25 yields to some degree to the pivotal motion of the upper member 17, but halts the upper member when, with the wheel 23 in the position shown at 23A, tension in the piston rod 38 equals the force, at the shock absorber lower-end pivot bolt 51, tending to effect extension of the piston rod. The lower member 18 is maintained at a desired distance from the upper member 17 by the connecting member 24 which pivots on the upper member 17 in synchronization with the end member 21 and thus keeps the lower member 18 in satisfactory self-alignment. Upward forces imposed on the wheel 23 in excess of those normally present when the aircraft is at rest on the ground may occur, as at landing; and in cushioning impacts imparting such forces, the shock absorber 25 may yield still further, in proportion to the severity of the impact, to allow the wheel 23 to move, with corresponding repositionings of the upper, lower, and end members 17, 18, 21 and the connecting member 24, to a still higher position. At the position of the wheel shown at 23B, the shock absorber piston rod 38 has reached the end of its outward stroke, and further upward movement of the wheel 23 is thereby prevented.

Figure 4:
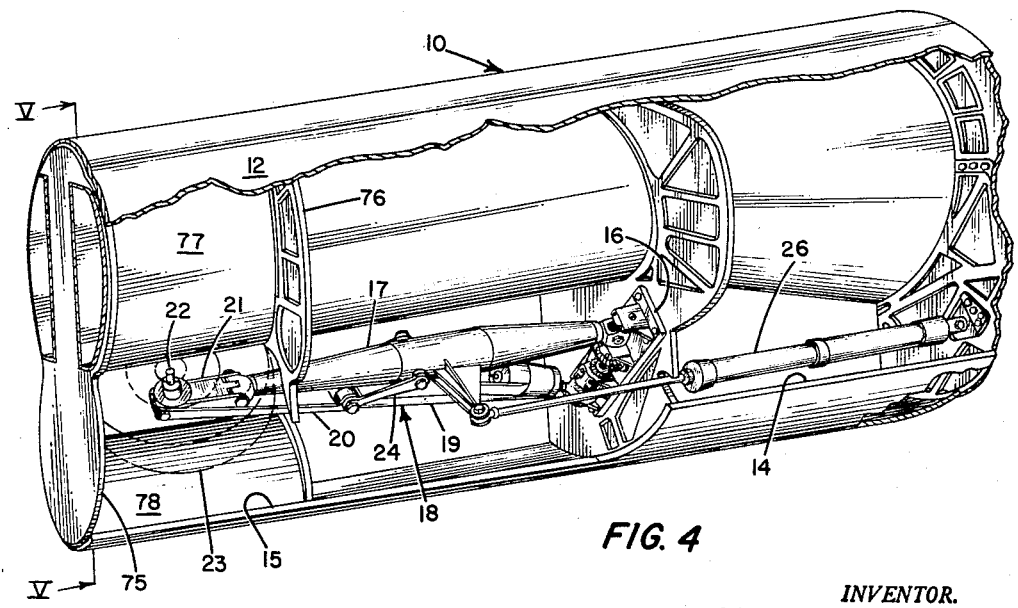
Figure 4 is a perspective view similar to Figure 1, the landing gear unit being retracted.
Figure 5:
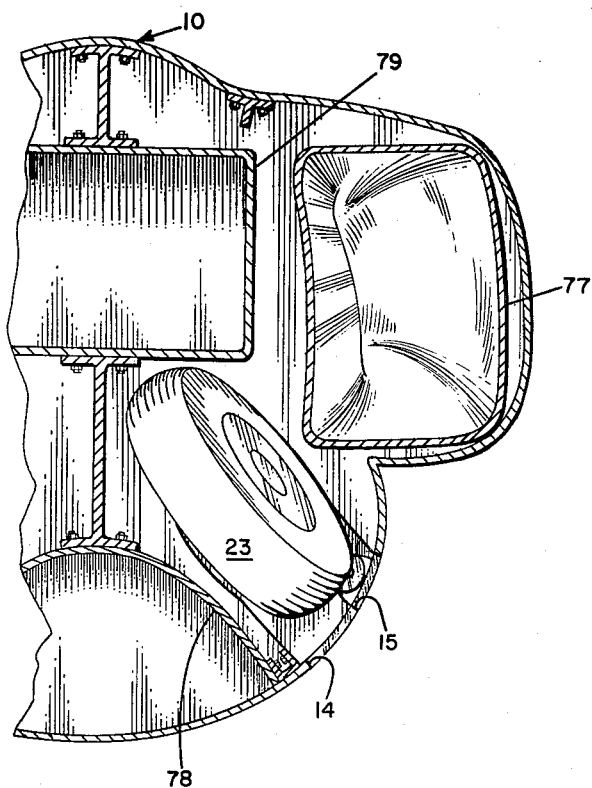
Figure 5 is a view, looking aft and taken along line V—V of Figure 4, of the wheel in its retracted position within the fuselage.

When the actuator 26 is caused to extend, the landing gear unit is caused to pivot on the shafts 32, 33 and thus to retract to the position shown in Figures 4 and 5 wherein the upper and lower members 17, 18 and actuator 26 extend generally forwardly within the fuselage 10 and the wheel 23 is moved to a position relative to the upper and lower members 17, 18 wherein it fits nicely into a fuselage space allotted thereto without striking adjoining items within the fuselage. As may be seen in Figure 4, the retracted wheel 23 lies aft of a bulkhead 75 and forward of another bulkhead 76, the degree of slant of the wheel 23 relative to the centerline of fuselage 10 being such that adequate clearance exists between the wheel and the bulkhead 76 aft of the wheel. As shown in Figure 5, the retracting wheel 23 must pass closely above a lower edge 14 of the skin opening and below an engine air duct 77 extending through the left-hand side of the fuselage 10, and in its fully retracted position lies in the vertically restricted space between the duct 77 and, for example, a structure 78 provided at the bottom of the fuselage for housing certain equipment or stores or the like utilized or carried by the aircraft. The wheel 23 also must clear, for example, a fuel cell 79 located above the wheel and inboard of the air duct 77. For purposes of illustration, it may be assumed that sufficiently strong reasons exist for not moving or changing the shape or size of the duct 77 and housing structure 78; consequently, the space in which the wheel 23 must be housed is dictated by the size and locations of the duct and housing structure, between which the wheel 23 must fit. During retraction of the unit 11, the repositioning of the wheel 23 relative to the upper member 17 brought about, as described, by an effective change of the length of the lower member 18 is accompanied by a drawing closer together of the upper and lower members 17, 18 as a result of the rotation, relative to the lower member, of the end and connecting members 21, 24. These positional changes combine with the forward pivoting of the unit 11 to bring the wheel 23 and other members of the unit 11 into the retracted position shown.

While only one embodiment of the invention has been shown in the accompanying drawings, it will be evident that various modifications are possible in the arrangement of the retractable landing gear components without departing from the scope of the invention.

I claim:
1. For an aircraft, a retractable landing gear unit comprising: a supporting member connected to said aircraft and pivotable thereon about an axis; means connected between said aircraft and said supporting member and operable for moving the latter from an extended to a retracted position by pivoting said supporting member about said axis; an axle; a wheel mounted on said axle; another member pivotally connecting said axle to said supporting member for permitting rotation of said axle relative to said supporting member; a motion-transmitting member connected to said other member, said motion-transmitting member being actuatable for pivoting said other member on said supporting member in a manner producing rotation of said axle relative to said supporting member; and connecting means connecting said motion-transmitting and supporting members and, operable for actuating said motion-transmitting member, said connecting means being energized by motion imparted thereto by said supporting member.

2. A retractable landing gear unit such as claimed in claim 1, said axis about which said supporting member is pivoted being upwardly slanted relative to said aircraft, and said supporting member further being pivotable upwardly and downwardly on said aircraft.

3. For an aircraft, a retractable landing gear unit comprising: a supporting member connected to said aircraft and pivotable about a first axis; means for moving said supporting member from an extended to a retracted position by pivoting said supporting member about said first axis; an axle; a wheel rotatably mounted on said axle; another member connecting said axle to said supporting member, said other member being rigidly connected to said axle and pivotally connected to said supporting member for permitting rotation of said axle in a substantially vertical plane relative to said supporting member when said supporting member is in said extended position; a motion-transmitting member connected to said other member and actuatable for effecting pivoting of said other member on said supporting member; and connecting means between said supporting and motion-transmitting members for transmitting motion of said supporting member about said first axis to said other member through said motion-transmitting member for effecting pivoting of said other member on said supporting member.

4. A retractable landing gear unit such as claimed in claim 3, said first axis lying in a vertical plane substantially parallel to a vertical plane through the axis of said axle, when said supporting member is in said extended position, and said motion-transmitting member being pivotally connected to said connecting means and to said other member.

5. For an aircraft having an airframe including a structural member, a landing gear unit retractable into said airframe and comprising: a first member mounted on said structural member and pivotable thereon, about an upwardly slanting axis, between an extended and a retracted position; a second member pivotally mounted on said structural member and rotatable about an axis parallel to said upwardly slanting axis between an extended and a retracted position; connecting means for receiving rotary motion of said first member about said upwardly slanting axis and imparting motion to said second member in a manner which results in axial motion of said second member relative to said axis parallel to said upwardly slanting axis, said connecting means being connected between said first and second members; another member pivotally attached to respective outer end portions of said first and second members; an axle rigidly mounted on said other member; a wheel mounted on said axle; a resilient member disposed obliquely of said first member, said resilient member being attached to said first member and pivotally mounted on said structural member for pivoting about said upwardly slanting axis; and actuating means connected to said first member and said airframe, said actuating means being operative for effecting pivoting of said first and resilient members about said upwardly slanting axis and said second member about said axis parallel to said slanting axis.

6. For an aircraft comprising an airframe having a fixed structural member, a landing gear unit retractable relative to said airframe and comprising: first and second pivotal mounting means provided on said fixed structural member and defining an upwardly and outwardly slanted axis; spaced-apart upper and lower members extending laterally downwardly from said airframe and respectively mounted on said first and second pivotal mounting means, said upper member being concentrically rotatable and said lower member being eccentrically rotatable between extended and retracted positions about said slanted axis; means for receiving rotary motion of said upper member and for responding thereto in a manner effecting axial displacement of said lower member relative to said slanted axis when said upper and lower members are rotated between said extended and retracted positions thereof, said means including an element of said second pivotal mounting means and being operatively connected to said upper member and to said lower member; an end member attached to respective outer ends of said upper and lower members and pivotable upwardly and downwardly thereon; an axle rigidly mounted on said end member; a wheel mounted on said axle; a shock absorber mounted on said fixed structural member of said airframe and thereon pivotable upwardly and downwardly and about said slanted axis, said shock absorber extending obliquely of and having pivotal attachment to said upper member; and actuating means for effecting pivoting of said upper and lower members and said shock absorber about said slanted axis, said actuating means being connected to said upper member and to said aircraft.

7. For an aircraft comprising a fuselage having fixed structural members, a retractable landing gear comprising: upper and lower members spaced apart throughout their lengths and extending laterally downwardly from said fuselage; a shock absorber pivotally attached to said upper member and extending obliquely therefrom to said fuselage; first, second, and third mounting means defining an inclined axis slanted laterally upward with respect to said fuselage, said mounting means attaching respective ends of said upper and lower members and shock absorbers to at least one of said fixed structural members and permitting rotation of said upper member and said shock absorber about said inclined axis, said first, second, and third mounting means further respectively permitting rotation of said upper and lower members and shock absorber about individual, parallel, substantially horizontal axes intersecting said inclined axis and extending longitudinally relative to said fuselage; connecting means connected to said upper and lower members and including said second mounting means, said connecting means constituting means operable for effecting axial displacement of said lower member relative to said inclined axis when said upper member is rotated about said inclined axis; an end member pivotally attached to respective outer ends of said upper and lower members and pivotable thereon about axes substantially parallel to the above-mentioned substantially horizontal axes; an axle rigidly mounted on said end member; a wheel mounted on said axle; and actuating means for pivoting said upper member about said inclined axis between extended and retracted positions thereof, said actuating means being pivotally attached to said upper member below said first mounting means and to one of said fixed structural members at a location longitudinally displaced, relative to said fuselage, from said first mounting means.

8. A retractable landing gear of the sort claimed in claim 7, said end member being disposed generally and approximately vertically when said upper member is in said extended position thereof.

9. A retractable landing gear such as claimed in claim 7, said actuator comprising a fluid-operated jack adapted for bearing rearwardly and forwardly directed forces exerted on said upper member.

10. A retractable landing gear of the sort claimed in claim 7, said end member being disposed generally and approximately vertically when said upper member is in said extended position thereof, said actuator comprising a fluid-operated jack adapted for bearing rearwardly and forwardly directed forces imposed on said upper member, and said third mounting means lying between said first and second mounting means.

11. For an aircraft comprising a fuselage having fixed structural members, a retractable landing gear comprising: an upper member extending laterally downwardly from said fuselage and pivotally mounted on one of said fixed structural members for pivoting about an axis inclined laterally upwardly and about a first generally horizontal axis extending longitudinally relative to said fuselage, a shock absorber pivotably mounted below said upper member on one of said fixed structural members for pivoting about said inclined axis and about a second generally horizontal axis parallel to the first, said shock absorber extending obliquely to and being pivotally attached to said upper member; a partially spherical body mounted on one of said fixed structural members and eccentrically pivotable about said inclined axis; a lower member mounted on and concentrically pivotable about said partially spherical body in planes including and in planes intersecting said inclined axis, said lower member extending laterally downward from said fuselage below said shock absorber and being spaced throughout its length from said upper member; an approximately vertical end member pivotally attached to respective outer ends of said upper and lower members for pivoting thereon about axes substantially parallel to said first generally horizontal axis; an axle rigidly mounted on said end member; a wheel mounted on said axle; an actuator pivotally attached to said upper member below said inclined axis and to one of said structural members of said fuselage longitudinally displaced from said inclined axis, said actuator being operable for pivoting said upper member on said inclined axis between extended and retracted positions thereof; and means transmitting rotary motion of said upper member about said inclined axis to said partially spherical body for effecting axial displacement of said lower member relative to said inclined axis when said upper member is pivoted by said actuator.

12. A retractable landing gear such as claimed in claim 11, said landing gear further including a connecting member pivotally connected to said upper member at a point substantially removed from the ends of said upper member; said lower member being articulated at a point substantially removed from said partially spherical body and being pivotally connected at said point to said connecting member.

13. For an aircraft comprising a fuselage provided with relatively fixed structural members, a retractable landing gear comprising: first and second shafts having a common axis and mounted in spaced-apart relationship on one of said relatively fixed structural members of said fuselage and rotatable on said common axis, said axis slanting laterally upwardly relative to said fuselage; an upper member extending laterally downwardly from said fuselage and pivotally mounted on said first shaft for rotation therewith about said common axis of said shafts and for pivoting about an axis normal to and intersecting said common axis; a shock absorber pivotally connected to said upper member and pivotally mounted on said lower shaft for rotation therewith about said common axis and for pivoting on an axis normal to and intersecting said common axis; a partially spherical body rigidly and eccentrically mounted on said second shaft below said shock absorber and rotatable with said second shaft about said common axis; a lower member extending laterally downward from said fuselage in spaced relation to said upper member and comprising an upper segment pivotally mounted on said partially spherical body for pivoting about an axis normal to said common axis and about an axis parallel to said common axis, said lower member further comprising a lower segment having a pivotal articulation with said upper segment; a member pivotally attached to said upper member at a point below said first shaft and to said lower member at said pivotal articulation of said upper and lower segments; an end member pivotally attached to respective outer ends of said upper and lower members; an axle rigidly mounted on said end member; a wheel mounted on said axle; a linear actuator pivotally attached to said upper member and to a one of said fixed structural members longitudinally spaced from said first shaft, said actuator being operable for pivoting said upper member between extended and retracted positions thereof on said common axis and being adapted for bearing forwardly and rearwardly directed loads imposed on said upper member; and connecting means including said upper and lower shafts and elements therebetween for transmitting pivotal motion of said upper member about said common axis to said partially spherical body for effecting axial displacement of said lower member relative to said common axis when said upper member is pivoted by said actuator about said common axis.

14. A retractable landing gear such as claimed in claim 13, said connecting means including a first gear mounted on said first shaft, a second gear mounted on said second shaft, and a third gear meshing with said first and second gears and rotatably mounted on one of said relatively fixed structural members of said fuselage.

15. A retractable landing gear such as claimed in claim 13, said upper segment of said lower member comprising an end fitting having an interior surface complementing and closely encircling said partially spherical body.

16. In an aircraft landing gear unit comprising a quadrilateral linkage having inner and outer ends, said linkage having at its inner end an end member rigidly mounted on said aircraft, at its outer end an end member bearing a wheel-carrying axle, a supporting member extending between and pivotally connected to said inner and outer end members, a motion-transmitting member extending between and pivotally connected to said inner and outer end members, and a joint in said motion-transmitting member rendering the same flexible at said joint, the combination with said supporting member of a connecting member extending between and pivotally attached to said supporting and motion-transmitting members in a manner wherein torque loads imposed upon said motion-transmitting member are transmitted through said connecting member into said supporting member, said connecting member being attached to said motion-transmitting member at said joint, and a shock absorber between and pivotally attached to said supporting member and said inner end member.

References Cited in the file of this patent
UNITED STATES PATENTS

| 2,323,640 | Armstrong | July 6, 1943 |
| 2,392,892 | Ward | Jan. 15, 1946 |
| 2,589,434 | Robert | Mar. 18, 1952 |
| 2,752,112 | Payne | June 26, 1956 |

FOREIGN PATENTS

| 571,200 | Great Britain | Aug. 10, 1945 |